(12) United States Patent
Uchimoto et al.

(10) Patent No.: US 10,190,517 B2
(45) Date of Patent: Jan. 29, 2019

(54) EXHAUST GAS PURIFYING APPARATUS FOR INTERNAL COMBUSTION ENGINE

(71) Applicants: HONDA MOTOR CO., LTD., Tokyo (JP); DENSO CORPORATION, Kariya, Aichi-pref. (JP)

(72) Inventors: Tatsuya Uchimoto, Wako (JP); Ken Ogawa, Wako (JP); Hiroshi Amaike, Wako (JP); Shinichi Okunishi, Wako (JP); Takehito Kimata, Kariya (JP); Takao Mishima, Kariya (JP)

(73) Assignees: Honda Motor Co., Ltd., Tokyo (JP); Denso Corporation, Kariya, Aichi-Pref. (JP)

( * ) Notice: Subject to any disclaimer, the term of this patent is extended or adjusted under 35 U.S.C. 154(b) by 47 days.

(21) Appl. No.: 15/335,121

(22) Filed: Oct. 26, 2016

(65) Prior Publication Data

US 2017/0138284 A1 May 18, 2017

(30) Foreign Application Priority Data

Nov. 16, 2015 (JP) .................................. 2015-223894

(51) Int. Cl.
*F01N 3/00* (2006.01)
*F02D 41/02* (2006.01)
(Continued)

(52) U.S. Cl.
CPC ..... *F02D 41/0235* (2013.01); *B01D 53/9431* (2013.01); *B01D 53/9445* (2013.01);
(Continued)

(58) Field of Classification Search
USPC .................................. 60/286, 295, 297, 301
See application file for complete search history.

(56) References Cited

U.S. PATENT DOCUMENTS 6,167,695 B1 * 1/2001 Itou ..................... B01D 53/9495
60/274
6,941,744 B2 * 9/2005 Tanaka .................. F01N 3/0842
60/277

(Continued)

FOREIGN PATENT DOCUMENTS

JP     2002-180865 A     6/2002
JP     2003-521614 A     7/2003
(Continued)

OTHER PUBLICATIONS

Japanese Office Action Notification of Reasons for Refusal application No. 2015-223894 dated Oct. 23, 2018.

*Primary Examiner* — Binh Q Tran
(74) *Attorney, Agent, or Firm* — Squire Patton Boggs (US) LLP (57) ABSTRACT

An exhaust gas purifying apparatus for an internal combustion engine, in which a NOx absorbing catalyst and a NOx concentration sensor for detecting a NOx concentration in exhaust gases of the engine, are provided in an exhaust passage of the engine. A rich spike for temporarily enriching the air-fuel ratio is performed, and an execution timing of the rich spike is determined based on a detected output from the NOx concentration sensor. Performing the rich spike is determined to be unnecessary during a reducing state period from the time the rich spike ends to the time a preset time period has elapsed, and is also determined to be unnecessary when a change tendency of the detected output is determined to be an output decreasing state where the detected output is decreasing. The execution timing of the rich spike is determined using the detected output when the change tendency is determined to be an output staying/increasing state where the detected output is staying at a constant value or increasing after the end timing of the reducing state period.

9 Claims, 6 Drawing Sheets

(51) Int. Cl.
*B01D 53/94* (2006.01)
*F01N 3/08* (2006.01)
*F01N 11/00* (2006.01)
*F02D 41/14* (2006.01)
*F02D 41/26* (2006.01)
*F01N 3/10* (2006.01)
*F01N 3/36* (2006.01)

(52) U.S. Cl.
CPC ....... *B01D 53/9495* (2013.01); *F01N 3/0814* (2013.01); *F01N 3/0842* (2013.01); *F01N 3/0885* (2013.01); *F01N 3/101* (2013.01); *F01N 3/36* (2013.01); *F01N 11/00* (2013.01); *F02D 41/0275* (2013.01); *F02D 41/1463* (2013.01); *F02D 41/26* (2013.01); *B01D 2255/91* (2013.01); *B01D 2258/012* (2013.01); *F01N 2550/03* (2013.01); *F01N 2560/026* (2013.01); *F01N 2570/14* (2013.01); *F01N 2610/03* (2013.01); *F01N 2900/0404* (2013.01); *F01N 2900/0416* (2013.01); *F01N 2900/0422* (2013.01); *F01N 2900/1402* (2013.01); *F02D 41/1475* (2013.01); *Y02A 50/2344* (2018.01); *Y02T 10/22* (2013.01); *Y02T 10/47* (2013.01)

(56) References Cited

U.S. PATENT DOCUMENTS

| | | | | |
|---|---|---|---|---|
| 7,000,385 | B2* | 2/2006 | Miyashita | F01N 3/0842 60/274 |
| 7,047,726 | B2* | 5/2006 | Katoh | F01N 3/0814 60/274 |
| 9,021,789 | B2* | 5/2015 | Sawada | B01D 53/90 60/274 |
| 9,459,242 | B2* | 10/2016 | Nakamura | F01N 3/0814 |

FOREIGN PATENT DOCUMENTS

| | | |
|---|---|---|
| JP | 2005-155627 A | 6/2005 |
| JP | 2007-051924 A | 3/2007 |

* cited by examiner

EXHAUST GAS PURIFYING APPARATUS FOR INTERNAL COMBUSTION ENGINE

BACKGROUND OF THE INVENTION

Field of the Invention

The present invention relates to an exhaust gas purifying apparatus for an internal combustion engine, and particularly, to an exhaust gas purifying apparatus having a NOx absorbing catalyst and a NOx concentration sensor which are provided in an exhaust passage of the internal combustion engine.

Description of the Related Art

Japanese Patent Laid-open publication No. 2002-180865 (JP'865) discloses an exhaust gas purifying apparatus in which a NOx absorbent is disposed in an exhaust passage of the internal combustion engine and a NOx concentration sensor (of the type that also reacts to ammonia) is disposed downstream of the NOx absorbent. In this apparatus, when performing the rich spike for temporarily enriching the air-fuel ratio for discharging NOx absorbed in the NOx absorbent, an amount of residual reducing agent is obtained based on changes in the ammonia concentration detected by the NOx concentration sensor. The detected value which is obtained, by the NOx concentration sensor, in the vicinity of the start timing of the rich spike, is regarded as a NOx concentration, while the detected value obtained in the vicinity of the end timing of the rich spike is regarded as an ammonia concentration. As shown in JP'865, it is known that the detected output from the NOx concentration sensor having an ion conductive solid electrolyte layer containing zirconia is proportional not only to the NOx concentration but also to a concentration of ammonia generated by performing the rich spike. In this specification, the "NOx concentration sensor" means a NOx concentration sensor having the ion conductive solid electrolyte layer containing zirconia.

According to the apparatus shown in JP'865, the detected output in the vicinity of the end timing of the rich spike is regarded as the ammonia concentration. However, the time period during which the reducing agent supplied by the rich spike reacts with NOx to generate ammonia, may not necessarily be constant. Accordingly, if the determination whether the detected output indicates the ammonia concentration or the NOx concentration is performed based only on the timing relationship with the rich spike end timing, the determination cannot be performed with high accuracy. For example, if it is determined that the detected output during a constant time period TNH3 from the rich spike end timing indicates the ammonia concentration, and the constant time period TNH3 is set to a too short time period, the ammonia concentration may erroneously be regarded as the NOx concentration after the constant time period TNH3 has elapsed, and the rich spike may be performed again immediately after the rich spike ends. On the other hand, if the constant time period TNH3 is set to a too long time period, the problem described below may occur. That is, in the state where the absorbing capacity of the NOx absorbent is reduced, NOx starts to flow out downstream of the NOx absorbent at a comparatively early timing after the rich spike ends. Accordingly, the NOx concentration may erroneously be regarded as the ammonia concentration, which may cause erroneous determination of the start timing of the next rich spike.

SUMMARY OF THE INVENTION

The present invention was made contemplating the above-described point, and an objective of the present invention is to provide an exhaust gas purifying apparatus which is able to appropriately perform the rich spike execution control based on the detected output from the NOx concentration sensor disposed downstream of the NOx absorbing catalyst.

To attain the above objective, the present invention provides an exhaust gas purifying apparatus for an internal combustion engine (1), in which a NOx absorbing catalyst (15) and a NOx concentration sensor (17) for detecting a NOx concentration in exhaust gases of the engine, are provided in an exhaust passage (13) of the engine. The NOx absorbing catalyst absorbs NOx in the exhaust gases when the exhaust gases are in an oxidizing state while the NOx absorbing catalyst reduces the absorbed NOx when the exhaust gases are in a reducing state, and the NOx concentration sensor is disposed downstream of the NOx absorbing catalyst. The exhaust gas purifying apparatus further includes enriching means for performing a rich spike in which an air-fuel ratio of an air-fuel mixture supplied to the engine is temporarily enriched to make the exhaust gases be in the reducing state. The enriching means determines an execution timing of the rich spike based on a detected output (SENSAX) from the NOx concentration sensor. The enriching means includes change tendency determining means for determining a change tendency of the detected output; determines that it is unnecessary to perform the rich spike during a reducing state period from the time (t2) the rich spike ends to the time a preset time period (TIM1) has elapsed; and also determines that it is unnecessary to perform the rich spike when the change tendency is determined to be an output decreasing state where the detected output is decreasing. On the other hand, the enriching means determines the execution timing of the rich spike using the detected output when the change tendency is determined to be an output staying/increasing state where the detected output is staying at a constant value or increasing after the end timing (t3) of the reducing state period.

With this configuration, the execution timing of the rich spike is determined based on the detected output from the NOx concentration sensor, and it is determined to be unnecessary to perform the rich spike during the reducing state period from the time the rich spike ends to the time the preset time period has elapsed. It is also determined to be unnecessary to perform the rich spike when the change tendency of the detected output is determined to be the output decreasing state where the detected output is decreasing. On the other hand, the execution timing of the rich spike is determined using the detected output when the change tendency is determined to be the output staying/increasing state where the detected output is staying at a constant value or increasing after the end timing of the reducing state period. In the output decreasing state where the detected output decreases in a comparatively short time period after the rich spike ends, it is confirmed that ammonia may exist near the NOx concentration sensor with high possibility. Accordingly, by determining that it is unnecessary to perform the rich spike during the reducing state period and in the output decreasing state immediately after the reducing state period, and by determining the execution timing of the rich spike using the detected output after the change tendency has shifted to the output staying/increasing state, it is possible to surely prevent erroneous determination of the rich spike execution timing due to influence of the ammonia concentration, and to perform the determination of the rich spike execution timing using the detected output from the time a comparatively short time period has elapsed after the rich spike ends. Consequently, it is possible to prevent the problem that the rich spike is performed immediately after the rich spike ends, or the problem that the rich spike execution timing is delayed when the absorbing capacity of the NOx absorbing catalyst is reduced.

Preferably, the exhaust gas purifying apparatus further includes sampling means and control detection value calculating means. The sampling means samples the detected output (SENSAX) at predetermined sampling intervals. The control detection value calculating means calculates a control detection value (SENSNOX) by performing a low-pass filtering of the sampled values of the detected output. Further, the enriching means determines the execution timing using the control detection value (SENSNOX) when the change tendency is determined to be the output staying/increasing state.

With this configuration, the detected output is sampled at predetermined sampling intervals, the control detection value is calculated by performing the low-pass filtering of the sampled values of the detected output, and the control detection value is used for determining the execution timing of the rich spike when the change tendency is determined to be the output staying/increasing state. Since the detected output from the NOx concentration sensor contains many slightly-changing components, using the detected output itself for the execution timing determination causes fluctuation of the determination result. Accordingly, such problem can be prevented by using the control detection value obtained by the low-pass filtering of the detected output, which eliminates the slightly-changing components contained in the detected output.

Preferably, the enriching means continues using the control detection value even if the change tendency is determined to be the output decreasing state after transition to the output staying/increasing state.

With this configuration, use of the control detection value is continued even if the change tendency is determined to be the output decreasing state after transition to the output staying/increasing state. It is confirmed that after transition to the output staying/increasing state, almost no ammonia exists near the NOx concentration sensor. Accordingly, it is considered that the determination that the change tendency is the output decreasing state is made due to reduction in the NOx concentration in the exhaust gases discharged from the engine caused by reduction in the engine load, or due to changes in the detected output caused by influence of noises. Consequently, the rich spike control can be stabilized by making such changes in the detected output give no influence to the determination of the change tendency.

Preferably, the change tendency determining means includes first moving average value calculating means and second moving average value calculating means. The first moving average value calculating means calculates a first moving average value (AVSNOX1) which is a moving average value of the latest sampled values of number "M", where "M" is an integer greater than "2". The second moving average value calculating means calculates a second moving average value (AVSNOX2) which is a moving average value of the latest sampled values of number "N", where "N" is an integer greater than "M". The change tendency determining means determines that a state where the first moving average value is equal to or greater than the second moving average value is the output staying/increasing state.

With this configuration, the first and second moving average values are calculated, wherein the first moving average value is a moving average value of the latest sampled values of number "M", and the second moving average value is a moving average value of the latest sampled values of number "N" which is greater than "M". Further, the state where the first moving average value is equal to or greater than the second moving average value is determined to be the output staying/increasing state. The detected output of the NOx concentration sensor contains many slightly-changing components. Accordingly, if the change tendency is determined using the detected output itself, the determination result may changes within a short time period, which makes it difficult to accurately perform the determination. Another determination method may be used, wherein only one moving average value, e.g., the second moving average value is calculated and the change tendency is determined only with the second moving average value (according to the relationship between the present value and the preceding value). However, it is confirmed that changes in the determination result is comparatively large when using such determination method. By determining the output staying/increasing state using the relationship between the two moving average values of which the sampling data numbers are different from each other, the determination of the change tendency can accurately be performed with comparatively good stability.

Preferably, the change tendency determining means fixes the determination that the change tendency is the output staying/increasing state when the determination result that the first moving average value (AVSNOX1) is equal to or greater than the second moving average value (AVSNOX2) is obtained consecutively a predetermined number (NCTH) of times.

With this configuration, the determination that the change tendency is the output staying/increasing state is fixed when the determination result that the first moving average value is equal to or greater than the second moving average value is obtained consecutively the predetermined number of times. Accordingly, more accurate and stabilized determination result can be obtained.

Preferably, the enriching means determines the execution timing using the control detection value (SENSNOX) after an upper limit time period (TIM2) which is longer than the preset time period (TIM1), has elapsed from the time (t2) the rich spike ends.

With this configuration, the execution timing is determined using the control detection value after the upper limit time period which is longer than the preset time period, has elapsed from the time the rich spike ends. The output decreasing state may sometimes continue for a comparatively long time period even when the influence of ammonia disappears. Accordingly, setting the upper limit time period to a time period which is considered to be necessary for the influence of ammonia to disappear, makes the determination of the change tendency of the detected output unnecessary after the upper time period has elapsed. Consequently, it is possible to reduce calculation load on the operation device, and to prevent excessive delay of using the control detection value.

DETAILED DESCRIPTION OF THE PREFERRED EMBODIMENTS

Preferred embodiments of the present invention will now be described with reference to the drawings.

Figure 1:
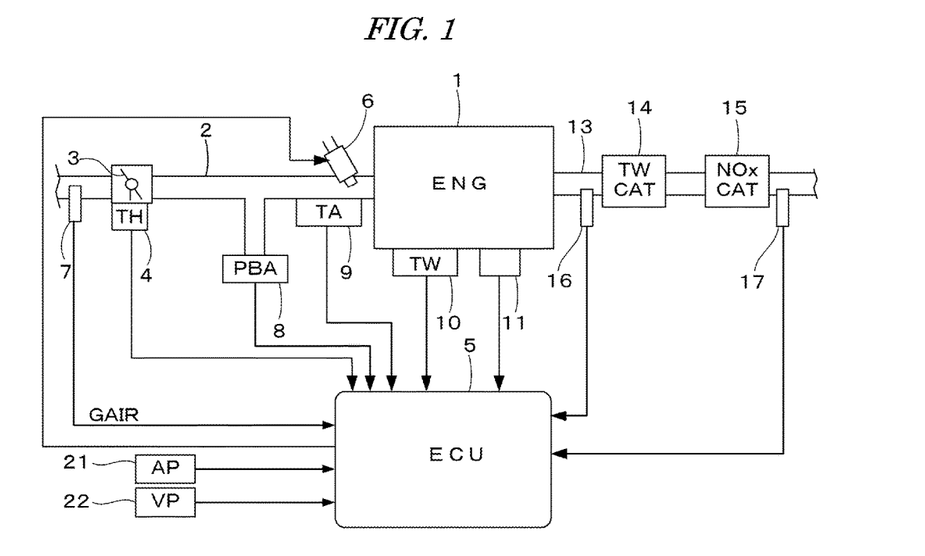
FIG. 1 shows a configuration of an internal combustion engine and a control apparatus therefor according to one embodiment of the present invention.

FIG. 1 shows a configuration of an internal combustion engine (hereinafter referred to as "engine") and a control apparatus therefor, according to one embodiment of the present invention. The engine 1 is, for example, a four-cylinder engine having an intake passage 2 provided with a throttle valve 3. A throttle valve opening sensor 4 is connected to the throttle valve 3, and the detection signal output from the throttle valve opening sensor 4 is supplied to an electronic control unit 5 (hereinafter referred to as "ECU").

Fuel injection valves 6 are inserted into the intake passage 2 at locations intermediate between the cylinder block of the engine 1 and the throttle valve 3 and slightly upstream of the respective intake valves (not shown). These fuel injection valves 6 are connected to a fuel supply passage (not shown) and are electrically connected to the ECU 5. A valve opening period and a valve opening timing of each fuel injection valve 6 is controlled by a signal output from the ECU 5. Each cylinder of the engine 1 is provided with an ignition plug (not shown) and the ignition timing is controlled by the ECU 5.

An intake air flow rate sensor 7 for detecting an intake air flow rate GAIR is provided upstream of the throttle valve 3. Further, an intake pressure sensor 8 for detecting an intake pressure PBA and an intake air temperature sensor 9 for detecting an intake air temperature TA are provided downstream of the throttle valve 3. A coolant temperature sensor 10 is mounted on the body of the engine 1 to detect an engine coolant temperature TW. The detection signals of these sensors 7-10 are supplied to the ECU 5.

A crank angle position sensor 11 for detecting a rotation angle of a crankshaft (not shown) of the engine 1 is connected to the ECU 5. A signal corresponding to the detected rotation angle of the crankshaft is supplied to the ECU 5. The crank angle position sensor 11 includes a cylinder discrimination sensor which outputs a pulse (hereinafter referred to as "CYL pulse") at a predetermined crank angle position for a specific cylinder of the engine 1. The crank angle position sensor 11 also includes a top dead center (TDC) sensor which outputs a TDC pulse at a crank angle position of a predetermined crank angle before the TDC at which the intake stroke starts in each cylinder (i.e., at every 180 deg crank angle in the case of a four-cylinder engine), and a crank angle (CRK) sensor for generating one pulse (hereinafter referred to as "CRK pulse") with a CRK period (e.g., a period of 30 degrees, shorter than the period of generation of the TDC pulse). The CYL pulse, the TDC pulse, and the CRK pulse are supplied to the ECU 5. The CYL, TDC and CRK pulses are used to control the various timings, such as the fuel injection timing and the ignition timing, and to detect an engine rotational speed NE.

An exhaust passage 13 of the engine 1 is provided with a three-way catalyst 14 and a NOx absorbing catalyst 15. A proportional type oxygen concentration sensor 16 (hereinafter referred to as "LAF sensor 16") is mounted on the upstream side of the three-way catalyst 14 and the downstream side of a collecting portion of the exhaust manifold communicating with each cylinder of the engine 1. The LAF sensor 16 outputs a detection signal substantially proportional to the oxygen concentration (air-fuel ratio) in the exhaust gases and supplies the detection signal to the ECU 5. A NOx concentration sensor 17 is provided downstream of the NOx absorbing catalyst 15.

The NOx absorbing catalyst 15 absorbs NOx in the exhaust gases when the exhaust gases are in an oxidizing state where an air-fuel ratio of the air-fuel mixture supplied to the engine 1 is set to a value on the lean side with respect to the stoichiometric air-fuel ratio. On the other hand, the NOx absorbing catalyst 15 reduces the absorbed NOx with reducing agents to discharge nitrogen gas, water vapor, and carbon dioxide when the exhaust gases are in a reducing state where the air-fuel ratio is set to a value on the rich side with respect to the stoichiometric air-fuel ratio. Further, the NOx absorbing catalyst 15 has a function of storing oxygen when the exhaust gases are in the oxidizing state, and discharging the stored oxygen when the exhaust gases are in the reducing state.

As shown in JP'865, ammonia ($NH_3$) is generated in the NOx absorbing catalyst 15 using a part of reducing agents that are not used for reducing NOx when the exhaust gases are in the reducing state, and the generated ammonia is discharged from the NOx absorbing catalyst 15. The NOx concentration sensor 17 has an ion conductive solid electrolyte layer containing zirconia, and the detected output from the NOx concentration sensor 17 is proportional not only to the NOx concentration but also to an ammonia concentration in the exhaust gases. Further in this embodiment, the NOx concentration sensor 17 has a function of detecting an oxygen concentration (air-fuel ratio) in the exhaust gases.

An accelerator sensor 21 and a vehicle speed sensor 22 are connected to the ECU 5. The accelerator sensor 21 detects an operation amount AP (hereinafter referred to as "accelerator pedal operation amount AP") of the accelerator (not shown) of the vehicle driven by the engine 1. The vehicle speed sensor 22 detects a running speed (vehicle speed) of the vehicle. The detection signals from these sensors are supplied to the ECU 5. The throttle valve 3 is actuated by an actuator (not shown) to open and close, and the throttle opening TH is controlled by the ECU 5 according to the accelerator pedal operation amount AP.

The ECU 5 includes an input circuit, a central processing unit (hereinafter referred to as "CPU"), a memory circuit, and an output circuit. The input circuit performs numerous functions, including shaping the waveforms of input signals from the various sensors, correcting the voltage levels of the input signals to a predetermined level, and converting analog signal values into digital signal values. The memory circuit preliminarily stores various operating programs to be executed by the CPU and stores the results of computations, or the like, by the CPU. The output circuit supplies actuation signals to the fuel injection valves 6 and the ignition plugs, and the like.

The ECU 5 determines various engine operating conditions based on the detection signals from the above-described sensors, and controls a fuel injection amount with the fuel injection valve 6. Basically, the ECU 5 controls the fuel injection amount so that the air-fuel ratio detected by the LAF sensor 16 coincides with the target air-fuel ratio, and timely performs a lean operation in which the air-fuel ratio is set to a value on the lean side with respect to the stoichiometric air-fuel ratio. An amount of NOx discharged from the engine 1 increases during the lean operation, but the discharged NOx is absorbed by the NOx absorbing catalyst 15. Accordingly, the NOx concentration of the exhaust gases which are finally discharged to the atmosphere, is suppressed below the regulation value.

There exists an upper limit of an amount of NOx that the NOx absorbing catalyst can absorb. In this embodiment, the rich spike in which the air-fuel ratio is temporarily set to a value on the rich side with respect to the stoichiometric air-fuel ratio (e.g., the value is about 13.5), is therefore performed when a NOx concentration CATNOX, which is calculated based on the detected output SENSAX from the NOx concentration sensor 17, exceeds a determination threshold value RSPNOX.

Figure 2:
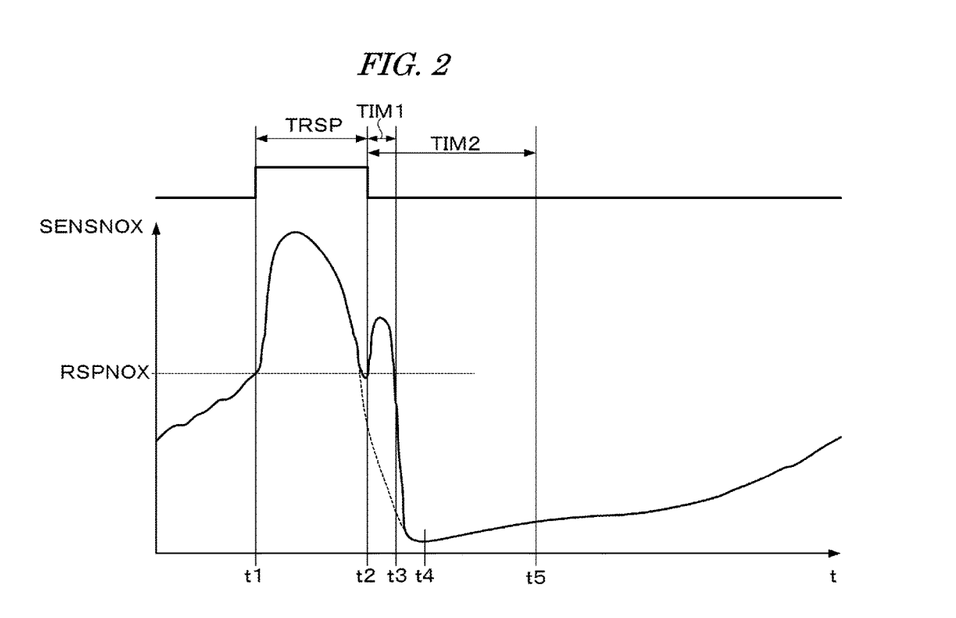
FIG. 2 is a time chart for illustrating changes in an output of a NOx concentration sensor immediately after performing a rich spike.

FIG. 2 is a time chart showing changes in a control detection value SENSNOX immediately after the rich spike is performed. An outline of the calculation method of the NOx concentration CATNOX in this embodiment is described below with reference to FIG. 2. The control detection value SENSNOX is a moving average value which is calculated by sampling the detected output SENSAX at predetermined sampling intervals and averaging the latest sampled values of number "K" (e.g., "5" sampled values). The control detection value SENSNOX is used in the rich spike control described below. Since the detected output SENSAX contains many slightly-changing components as described below, the moving average value of the detected output SENSAX is used for the control as the control detection value SENSNOX.

In FIG. 2, the time period TRSP from time t1 to t2 is a rich spike execution time period, and the actual NOx concentration indicated by the broken line decreases immediately after the rich spike ends. However, since the detected output SENSAX is also responsive to ammonia discharged from the NOx absorbing catalyst 15, the control detection value SENSNOX temporarily increases after time t2, and thereafter decreases. In this embodiment, the rich spike execution time period TRSP is set to a predetermined time period for which all of NOx absorbed in the NOx absorbing catalyst 15 is estimated to be reduced (e.g., 10 seconds). It is to be noted that RSPNOX shown in FIG. 2 is a determination threshold value for determining an execution timing of the rich spike.

In this embodiment, the NOx concentration CATNOX is calculated as described below and the calculated NOx concentration CATNOX is applied to the rich spike execution control to remove the influence of ammonia immediately after execution of the rich spike.

1) During a time period (hereinafter referred to as "reducing state period TRA) from time t2 at which the rich spike ends to time t3 at which a first time period TIM1 has passed from time t2, the NOx concentration CATNOX is set not to the control detection value SENSNOX but to a first substitutive value RPNOX1.

2) After time t3, a change tendency of the detected output SENSAX, that is, whether the change tendency is an output decreasing state where the detected output SENSAX is decreasing, or an output staying/increasing state where the detected output SENSAX is staying at a constant value or increasing, is determined. In the output decreasing state immediately after time t3, the NOx concentration CATNOX is set not to the control detection value SENSNOX but to a second substitutive value RPNOX2.

3) After a time (time t4) at which the change tendency is determined to be the output staying/increasing state after time t3, the NOx concentration CATNOX is set to the control detection value SENSNOX. Even if the change tendency is determined to be the output decreasing state after time t4, the NOx concentration CATNOX is not changed to the second substitutive value RPNOX2 but is continued to be set to the control detection value SENSNOX.

4) After time t5 at which a second time period TIM2 has elapsed from time t2, the determination of the change tendency is not performed and the NOx concentration CATNOX is set to the control detection value SENSNOX.

The first and second substitutive values RPNOX1 and RPNOX2 are set, for example, to a constant value (e.g., "0") which is less than the determination threshold value RSPNOX. According to this setting of the substitutive values RPNOX1 and RPNOX2, performing the rich spike is determined to be unnecessary (refer to FIG. 4 described later).

The first time period TIM1 is preferably set according to an operating condition of the engine 1. For example, a time period (hereinafter referred to as "rich AF detection time period TR") from the time an oxygen concentration decreases to a value (e.g. nearly "0") which is equal to or less than a rich AF determination threshold value after the rich spike starts, to the time the rich spike ends (FIG. 2, time t2), is measured, and the first time period TIM1 is preferably set so as to increase as the rich AF detection time period TR increases, wherein the oxygen concentration is detected using the oxygen concentration detecting function of the NOx concentration sensor 17. The reason for such setting of the first time period TIM1 is that the rich AF detection time period TR co-relates with a time period during which the exhaust gases flowing into the NOx absorbing catalyst 15 are in the reducing state, and the generation amount of ammonia increases as the rich AF detection time period TR increases. The second time period TIM2 is set to a constant time period which is previously set. The control detection value SENSNOX may possibly continue, depending on the operating condition of the engine 1, to decrease for a comparatively long time period after the rich spike ends. Accordingly, the second time period TIM2, which corresponds to an upper limit time period for performing the change tendency determination, is set to a time period during which the influence of ammonia surely disappears.

Figure 3:
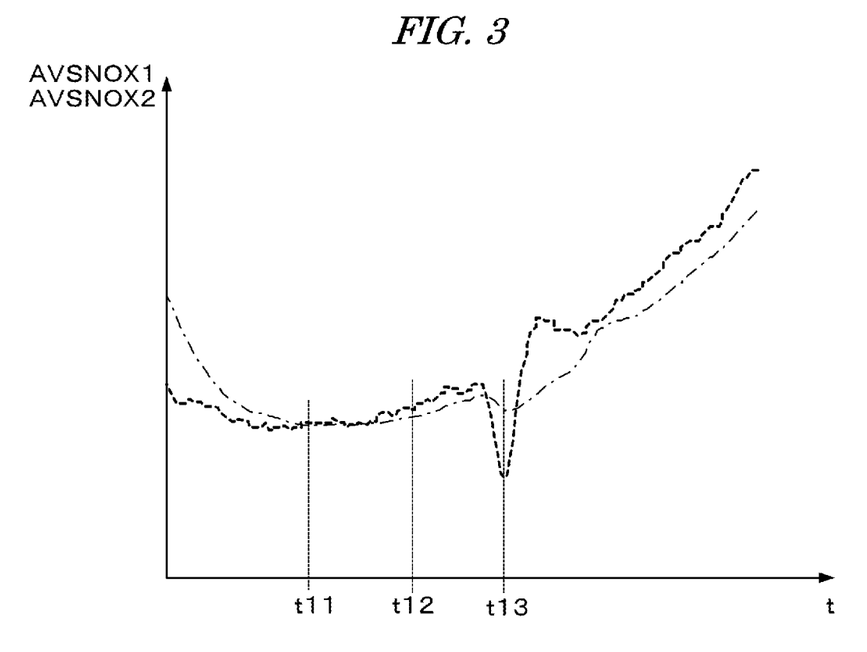
FIG. 3 is a time chart for illustrating a method for determining a change tendency of the NOx concentration sensor output.

Next, a method for determining the change tendency is described below with reference to FIG. 3. Since the detected output SENSAX from the NOx concentration sensor 17 contains many slightly-changing components as described above, the change tendency is determined using two moving average values which are respectively calculated with sampled values of different numbers. FIG. 3 shows changes in the moving average values calculated using the detected output SENSAX indicated around time t4 of FIG. 2. In FIG. 3, the broken line indicates changes in a moving average value (hereinafter referred to as "first moving average value) AVSNOX1 of the latest sampled values of number "M" (e.g., "5"), and the dashed line indicates changes in a moving average value (hereinafter referred to as "second moving average value) AVSNOX2 of the latest sampled values of number "N" (e.g., "20"). The control detection value SENSNOX (refer to FIG. 2) is calculated, as described above, as a moving average value of the latest sampled values of number "K", and is applied to the determination of the rich spike execution timing. The numbers "K", "M", and "N" are empirically set to respective appropriate values.

In this embodiment, the first and second moving average values AVSNOX1 and AVSNOX2 are calculated and the change tendency is determined as follows: the change tendency is determined to be the output staying/increasing state when the first moving average value AVSNOX1 is equal to or greater than the second moving average value AVSNOX2, and the change tendency is determined to be the output decreasing state when the change tendency is not determined to be the output staying/increasing state. Further, the determination that the change tendency is the output staying/increasing state is fixed when the determination result that the first moving average value AVSNOX1 is equal to or greater than the second moving average value AVSNOX2 is obtained consecutively a predetermined number NCTH of times (e.g., "20" times). The predetermined number NCTH is empirically set to an appropriate value. In the example shown in FIG. 3, the first moving average value AVSNOX1 begins to exceed the second moving average value AVSNOX2 around time t11. However, since the same determination result does not continue, the determination is not fixed immediately after time t11. The determination that the change tendency is the output staying/increasing state is finally fixed at time t12.

Using this determination method of the change tendency makes it possible to accurately perform the determination with good stability. In the example shown in FIG. 3, the change tendency shifts to the output decreasing state at around time t13 after time t12 at which the determination that the change tendency is the output staying/increasing state is fixed. However, this shift of the change tendency is not caused by the change in the NOx concentration or in the ammonia concentration, but caused by influence of noises. With consideration of such influence of noises, even if the change tendency is determined to shift to the output decreasing state after fixing the determination that the change tendency is the output staying/increasing state after the rich spike ends, the NOx concentration CATNOX is not set to the second substitutive value RPNOX2, but is continued to be set to the control detection value SENSNOX (refer to the item 3) described above).

Figure 4:
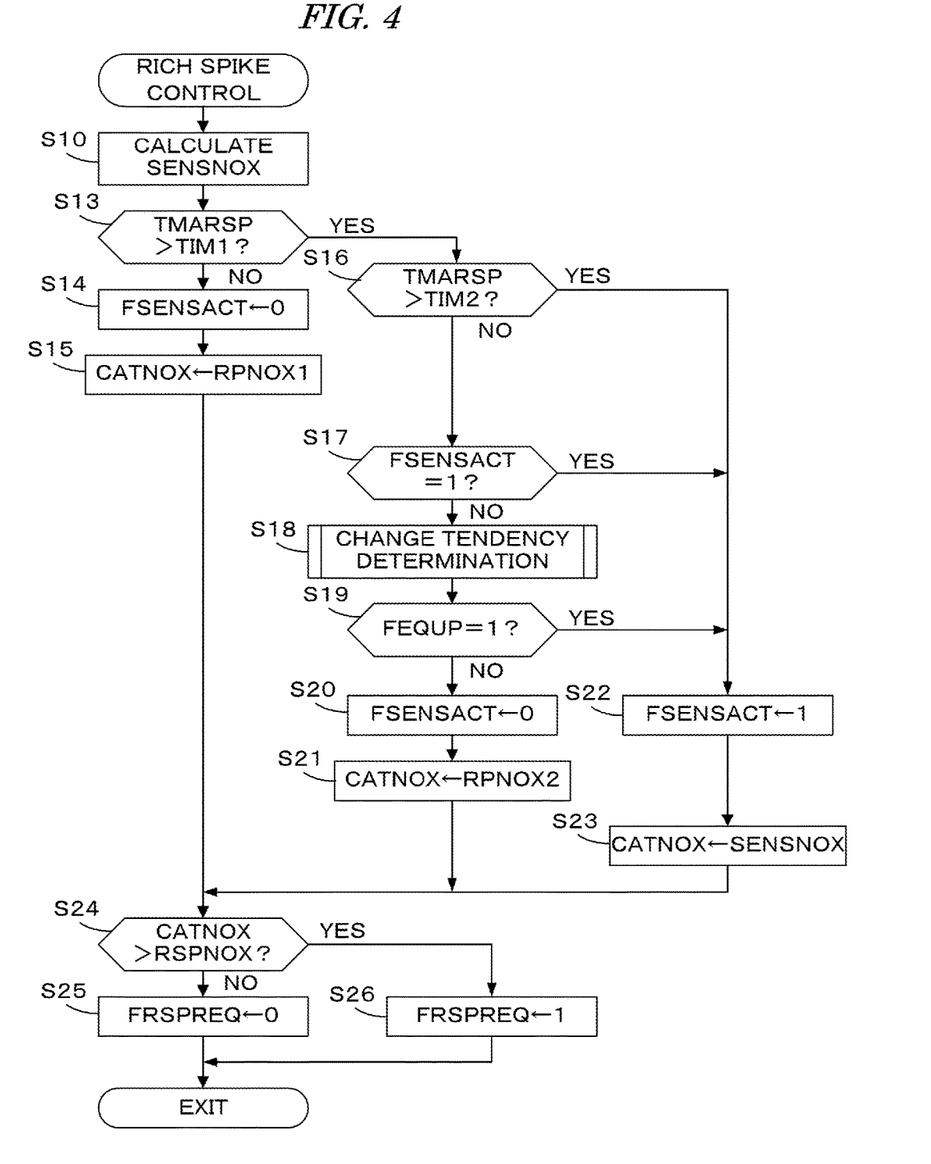
FIG. 4 is a flowchart of a process for performing a rich spike control according to the NOx concentration sensor output.

FIG. 4 is a flowchart of a process for performing the rich spike control in which the NOx concentration CATNOX is calculated according to the detected output SENSAX from the NOx concentration sensor 17. This process is executed at intervals synchronized with rotation of the crankshaft of the engine 1. It is to be noted that the sampling of the detected output SENSAX is performed in another process (not shown) at predetermined sampling intervals (e.g., interval of 10 msec).

In step S10, the control detection value SENSNOX, which is used for the rich spike execution determination, is calculated as a moving average value of the latest five sampled values of the detected output SENSAX. In step S13, it is determined whether or not an elapsed time period TMARSP from the end timing of the preceding rich spike (FIG. 2, t2) exceeds the first time period TIM1. Immediately after the end timing of the preceding rich spike, the answer to step S13 is negative (NO). Accordingly, a detected value use flag FSENSACT is set to "0" (step S14) and the NOx concentration CATNOX is set to the first substitutive value RPNOX1 (step S15). The process thereafter proceeds to step S24.

Figure 5:
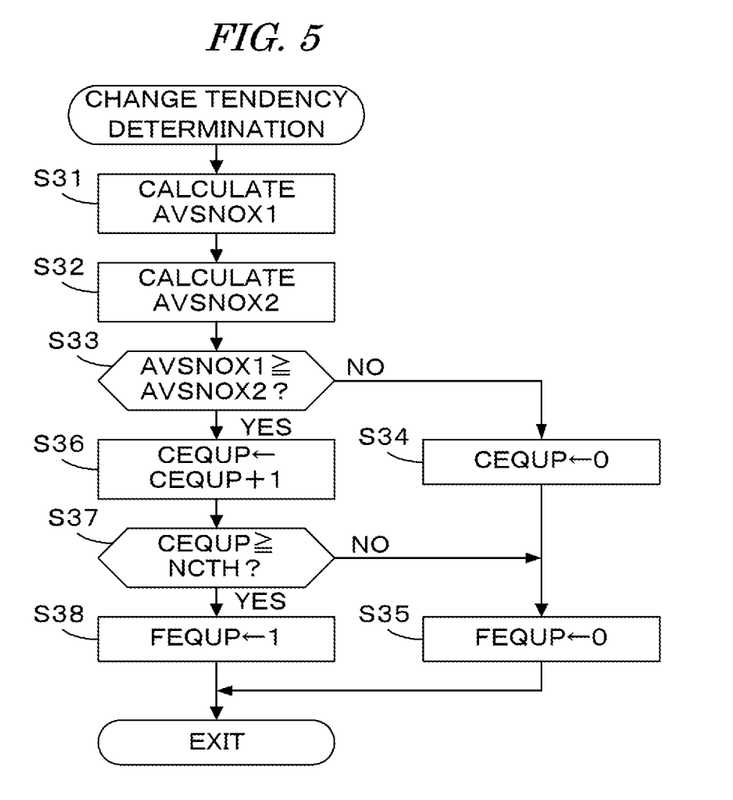
FIG. 5 is a flowchart of the change tendency determination process executed in the process of FIG. 4.

If the answer to step S13 is affirmative (YES), it is further determined whether or not the elapsed time period TMARSP exceeds the second time period TIM2 (step S16). If the answer to step S16 is negative (NO), it is determined whether or not the detected value use flag FSENACT is "1" (step S17). If the answer to step S17 is negative (NO), a change tendency determination process shown in FIG. 5 is executed (step S18). If the answer to step S16 or S17 is affirmative (YES), the process proceeds to step S22, in which the detected value use flag FSENSACT is set to "1", and the NOx concentration CATNOX is set to the control detection value SENSNOX (step S23). The process thereafter proceeds to step S24.

In step S31 of FIG. 5, the first moving average value AVSNOX1 is calculated, and the second moving average value AVSNOX2 is calculated in step S32. In step S33, it is determined whether or not the first moving average value AVSNOX1 is equal to or greater than the second moving average value AVSNOX2. If the answer to step S33 is negative (NO), a value of a counter CEQUP is set to "0" (step S34) and an output staying/increasing flag FEQUP is set to "0" (step S35).

If the answer to step S33 is affirmative (YES), the value of the counter CEQUP is incremented by "1" (step S36), and it is determined whether or not the value of the counter CEQUP is equal to or greater than the predetermined number NCTH (step S37). If the answer to step S37 is negative (NO), the process proceeds to step S35. When the answer to step S37 becomes affirmative (YES), the determination that the change tendency is the output staying/increasing state is fixed, and the output staying/increasing flag FEQUP is set to "1" (step S38).

According to the process of FIG. 5, the determination that the change tendency is the output staying/increasing state is fixed when the state where the first moving average value AVSNOX1 is equal to or greater than the second moving average value AVSNOX2 continues consecutively for the predetermined number NCTH of times.

Returning to FIG. 4, it is determined in step S19 whether or not the output staying/increasing flag FEQUP is "1". If the answer to step S19 is negative (NO), that is, the change tendency is the output decreasing state, the detected value use flag FSENSACT is set to "0" (step S20), and the NOx concentration CATNOX is set to the second substitutive value RPNOX2 (step S21). The process thereafter proceeds to step S24. If the answer to step S19 is affirmative (YES), i.e., the change tendency is the output staying/increasing state, the process proceeds to step S22.

After the detected value use flag FSENSACT is set to "1" in step S22, the answer to step S17 becomes affirmative (YES), and the setting of the NOx concentration CATNOX to the control detection value SENSNOX continues without performing the change tendency determination. The above-described operation steps of 1) to 4) are executed in steps S13 to S23.

In step S24, it is determined whether or not the NOx concentration CATNOX exceeds the determination threshold value RSPNOX. If the answer to step S24 is negative (NO), a rich spike request flag FRSPREQ is set to "0" (step S25). If the answer to step S24 is affirmative (YES), the rich spike request flag FRSPREQ is set to "1" (step S26).

When the rich spike request flag FRSPREQ changes from "0" to "1", the rich spike is performed for a predetermined time period (FIG. 2, TRSP).

Figure 6A:
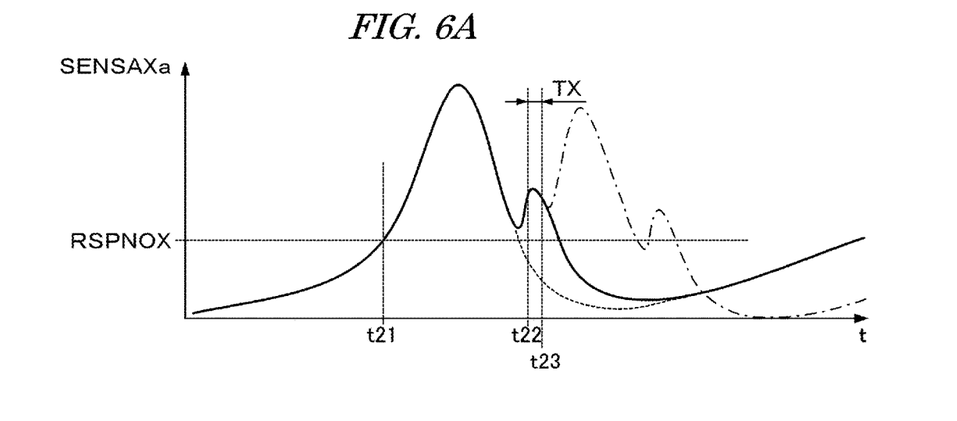
FIGS. 6A and 6B are time charts for illustrating effects obtained by performing the rich spike control shown in FIG. 4.
Figure 6B:
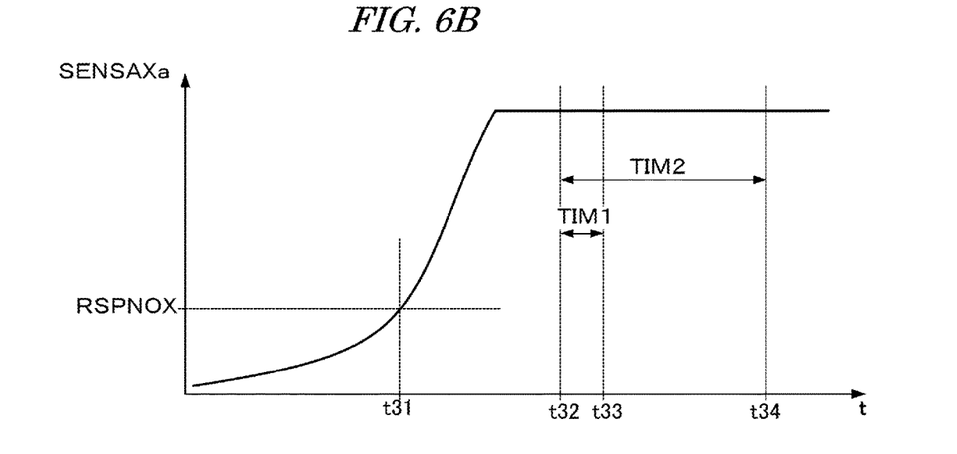

FIGS. 6A and 6B are time charts for explaining the effect of performing the rich spike control described above. In these drawings, a detected output SENSAXa indicates an output of the NOx concentration sensor 17 that does not saturate. A waveform of which the contained slightly-changing components are removed, is shown as the detected output SENSAXa. FIG. 6A shows an example where a method that the detected output SENSAXa is not used for the rich spike execution timing determination during a predetermined time period TX after the rich spike ends is employed, and the predetermined time period TX is excessively short. In this example, the rich spike is performed from time t21 to time t22, and the rich spike execution timing determination using the detected output SENSAXa is started from time t23 at which the predetermined time period TX has elapsed from time t22. However, the detected output SENSAXa has already exceeded the determination threshold value RSPNOX at time t23, which results in the problem that the next rich spike is immediately started. It is to be noted that the broken line of FIG. 6A indicates changes in the real NOx concentration, and the dashed-line indicates changes in the detected output SENSAXa if the rich spike is started from time t23.

FIG. 6B shows an example where the rich spike is performed from time t31 to time t32, and an abnormality that the detected output SENSAXa is fixed at a high level has occurred during the execution of the rich spike. If the change tendency determination is not performed after the rich spike ends, the abnormality detection can be performed from time t34 at which the influence of ammonia may surely disappear. Accordingly, the abnormality detection is delayed. On the other hand, according to this embodiment, the change tendency determination of the detected output SENSAXa is performed from time t33 at which the first time period TIM1 has elapsed from the time t32, and the detected output SENSAXa is referred to as the NOx concentration CATNOX immediately after time t33. This makes it possible at an earlier timing to detect occurrence of the abnormality in the NOx concentration sensor 17.

As described above, in this embodiment, the execution timing of the rich spike is determined based on the detected output SENSAX from the NOx concentration sensor 17. During the reducing state period TRA from the end timing (FIG. 2, t2) of the rich spike to the time the first time period TIM1 has elapsed from the end timing, the NOx concentration CATNOX is set to the first substitutive value RPNOX1. When the change tendency is determined to be the output decreasing state where the detected output SENSAX is decreasing immediately after the end timing (FIG. 2, t3) of the reducing state period TRA, the NOx concentration CATNOX is set to the second substitutive value RPNOX2, wherein the first and second substitutive values RPNOX1 and RPNOX2 are set respectively to values less than the determination threshold value RSPNOX. Accordingly, it is determined to be unnecessary to perform the rich spike during the reducing state period TRA and in the output decreasing state immediately after the reducing state period TRA. On the other hand, the execution timing of the rich spike is determined using the control detection value SENSNOX when the change tendency is determined to be the output staying/increasing state where the detected output SENSAX is staying at a constant value or increasing after the end timing of the reducing state period. In the output decreasing state where the detected output SENSAX is decreasing, it is confirmed that ammonia may exist near the NOx concentration sensor 17 with high possibility. Accordingly, by determining that it is unnecessary to perform the rich spike during the reducing state period and in the output decreasing state immediately after the reducing state period, and by determining the execution timing of the rich spike using the detected output SENSNOX after the change tendency has shifted to the output staying/increasing state, it is possible to surely prevent erroneous determination of the rich spike execution timing due to influence of the ammonia concentration, and to perform the determination of the rich spike execution timing using the control detection value SENSNOX from the time a comparatively short time period has elapsed after the rich spike ends. Consequently, it is possible to prevent the problem that the rich spike is performed immediately after the rich spike ends, or the problem that the rich spike execution timing is delayed when the absorbing capacity of the NOx absorbing catalyst 15 is reduced.

Further, the detected output SENSAX is sampled at predetermined sampling intervals, the control detection value SENSNOX is calculated by performing the moving average calculation (the low-pass filtering) of the sampled values of the detected output SENSAX, and the control detection value SENSNOX is used for determining the execution timing of the rich spike when the change tendency is determined to be the output staying/increasing state. Since the detected output SENSAX from the NOx concentration sensor 17 contains many slightly-changing components, using the detected output SENSAX itself for the execution timing determination causes fluctuation of the determination result. Accordingly, such problem can be prevented by using the control detection value SENSNOX obtained by the moving average calculation of the detected output SENSAX, which eliminates the slightly-changing components contained in the detected output SENSAX.

Further, use of the control detection value SENSNOX is continued even if the change tendency is determined to be the output decreasing state after transition to the output staying/increasing state. It is confirmed that after transition to the output staying/increasing state, almost no ammonia exists near the NOx concentration sensor 17. Accordingly, it is considered that the determination that the change tendency is the output decreasing state is made due to reduction in the NOx concentration in the exhaust gases discharged from the engine caused by reduction in the engine load, or due to changes in the detected output SENSAX caused by influence of noises. Consequently, the rich spike control can be stabilized by making such changes in the detected output SENSAX give no influence to the determination of the change tendency.

Further, the first moving average value AVSNOX1 which is a moving average value of the latest "5" sampled values, and the second moving average value AVSNOX2 which is a moving average value of the latest "20" sampled values, are calculated. The state where the first moving average value AVSNOX1 is equal to or greater than the second moving average value AVSNOX2 is determined to be the output staying/increasing state. The detected output SENSAX of the NOx concentration sensor 17 contains many slightly-changing components. Accordingly, if the change tendency is determined using the detected output SENSAX itself, the determination result may change within a short time period, which makes it difficult to accurately perform the determination. Another determination method may be used, wherein only one moving average value, e.g., the second moving average value AVSNOX2 is calculated and the change tendency is determined only with the second moving average value AVSNOX2 (according to the relationship between the present value and the preceding value). However, it is confirmed that changes in the determination result is comparatively large when using such determination method. By determining the output staying/increasing state using the relationship between the two moving average values of which the sampling data numbers are different from each other, the determination of the change tendency can accurately be performed with comparatively good stability.

Further, the determination that the change tendency is the output staying/increasing state is fixed when the determination result that the first moving average value AVSNOX1 is equal to or greater than the second moving average value AVSNOX2 is obtained consecutively the predetermined number NCTH of times. Accordingly, more accurate and stabilized determination result can be obtained.

Further, the execution timing is determined using the control detection value SENSNOX after the second time period TIM2 has elapsed from the time the rich spike ends, the second time period TIM2 being set as the upper limit time period which is longer than the first time period TIM1 which corresponds to the preset time period of the reducing state period TRA. The output decreasing state may sometimes continue for a comparatively long time period even after the influence of ammonia disappears. Accordingly, setting the second time period TIM2 to a time period which is considered to be necessary for the influence of ammonia to disappear, makes the determination of the change tendency of the detected output SENSAX unnecessary after the second time period TIM2 has elapsed. Consequently, it is possible to reduce calculation load on the operation device, and to prevent excessive delay of using the control detection value SENSNOX.

In this embodiment, the ECU 5 constitutes a part of the enriching means, the change tendency determining means, the sampling means, the control detection value calculating means, the first moving average value calculating means, and the second moving average value calculating means. The fuel injection valve 6 constitutes a part of the enriching means.

Modification 1

Figure 7A:
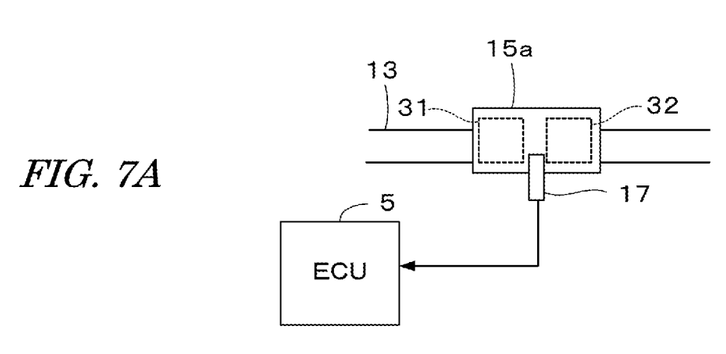
FIGS. 7A and 7B show modifications regarding a location of the NOx concentration sensor.

As shown in FIG. 7A, if a NOx absorbing catalyst 15a disposed in the exhaust passage 13 is configured with an upstream catalyst 31 and a downstream catalyst 32, the NOx concentration sensor 17 may be disposed at a position which is on the downstream side of the upstream catalyst 31 and on the upstream side of the downstream catalyst 32. With this configuration, the state where an amount of NOx absorbed by the downstream catalyst 32 has saturated cannot directly be detected from the detection result of the NOx concentration sensor 17, but the state where an amount of NOx absorbed by the upstream catalyst 31 has saturated can be detected earlier compared with the above-described embodiment. Accordingly, it is possible to estimate the timing of saturation of the absorbed NOx amount of the downstream catalyst 32 based on the timing of saturation of the absorbed NOx amount of the upstream catalyst 31, thereby determining the rich spike execution timing.

According to the configuration shown in FIG. 7A, it is possible to set the end timing of the rich spike based on the output from the NOx concentration sensor 17, instead of setting the execution time period of the rich spike to a predetermined time period. In the case where the NOx concentration sensor 17 is disposed downstream of the NOx absorbing catalyst 15 as shown in the above-described embodiment and the end timing of the rich spike is determined based on the output from the NOx concentration sensor 17, the end timing of the rich spike may become so late that the residual reducing agent is discharged from the NOx absorbing catalyst 15. On the other hand, employing the configuration of this modification makes it possible to appropriately determine the end timing of the rich spike based on the output from the NOx concentration sensor 17.

Modification 2

Figure 7B:
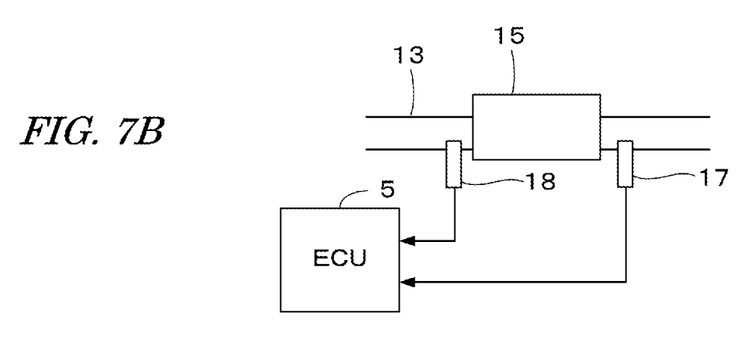

As shown in FIG. 7B, a NOx concentration sensor 18 may also be disposed upstream of the NOx absorbing catalyst 15.

In this modification, a NOx removing ratio RNOX (=CATNOX/CNOXUP) which is a ratio of a NOx concentration CNOXUP detected by the NOx concentration sensor 18 and a NOx concentration CATNOX detected by the NOx concentration sensor 17, may be calculated, and the rich spike may be started from the time the NOx removing ratio RNOX exceeds a removing ratio threshold value RNOXTH.

The present invention is not limited to the above-described embodiment, and various modifications may be made. For example, in the above-described embodiment, the control detection value SENSNOX is calculated by performing the moving average calculation of the detected output SENSAX. Alternatively, a low-pass filtering calculation other than the moving average calculation may be used.

Further, if the detected output SENSAX contains few slightly-changing components, the detected output SENSAX may be used itself as the control detection value SENSNOX. The numbers of sampled values applied to calculating the moving average values AVSNOX1 and AVSNOX2 are not limited to "5" and "20", but may be set to other values according to the slightly-changing components contained in the detected output SENSAX.

What is claimed is:

1. An exhaust gas purifying apparatus for an internal combustion engine, in which a NOx absorbing catalyst and a NOx concentration sensor for detecting a NOx concentration in exhaust gases of said engine, are provided in an exhaust passage of said engine, wherein said NOx absorbing catalyst absorbs NOx in the exhaust gases when the exhaust gases are in an oxidizing state while said NOx absorbing catalyst reduces the absorbed NOx when the exhaust gases are in a reducing state, and said NOx concentration sensor is disposed downstream of said NOx absorbing catalyst, said exhaust gas purifying apparatus comprising enriching means for performing a rich spike in which an air-fuel ratio of an air-fuel mixture supplied to said engine is temporarily enriched to make the exhaust gases be in the reducing state, said enriching means determining an execution timing of the rich spike based on a detected output from said NOx concentration sensor, wherein said enriching means includes change tendency determining means for determining a change tendency of the detected output;

determines that it is unnecessary to perform the rich spike during a reducing state period from the time the rich spike ends to the time a preset time period has elapsed;

begins the determination by said change tendency determining means at an end timing of a period of the reducing state; and determines that it is unnecessary to perform the rich spike when the change tendency is determined to be an output decreasing state where the detected output is decreasing, wherein said enriching means determines the execution timing of the rich spike using the detected output when the change tendency is determined to be an output staying/increasing state where the detected output is staying at a constant value or increasing after the end timing of the reducing state period.

2. The exhaust gas purifying apparatus according to claim 1, further comprising:

sampling means for sampling the detected output at predetermined sampling intervals; and control detection value calculating means for calculating a control detection value by performing a low-pass filtering of the sampled values of the detected output, wherein said enriching means determines the execution timing using the control detection value when the change tendency is determined to be the output staying/increasing state.

3. The exhaust gas purifying apparatus according to claim 2, wherein said enriching means continues using the control detection value even if the change tendency is determined to be the output decreasing state after transition to the output staying/increasing state.

4. The exhaust gas purifying apparatus according to claim 3, wherein said change tendency determining means includes:
  first moving average value calculating means for calculating a first moving average value which is a moving average value of the latest sampled values of number "M", where "M" is an integer greater than "2"; and
  second moving average value calculating means for calculating a second moving average value which is a moving average value of the latest sampled values of number "N", where "N" is an integer greater than "M",
  wherein said change tendency determining means determines that a state where the first moving average value is equal to or greater than the second moving average value is the output staying/increasing state.

5. The exhaust gas purifying apparatus according to claim 4, wherein said change tendency determining means fixes the determination that the change tendency is the output staying/increasing state, when the determination result that the first moving average value is equal to or greater than the second moving average value is obtained consecutively a predetermined number of times.

6. The exhaust gas purifying apparatus according to claim 2, wherein said enriching means determines the execution timing using the control detection value after an upper limit time period which is longer than the preset time period, has elapsed from the time the rich spike ends.

7. The exhaust gas purifying apparatus according to claim 3, wherein said enriching means determines the execution timing using the control detection value after an upper limit time period which is longer than the preset time period, has elapsed from the time the rich spike ends.

8. The exhaust gas purifying apparatus according claim 4, wherein said enriching means determines the execution timing using the control detection value after an upper limit time period which is longer than the preset time period, has elapsed from the time the rich spike ends.

9. The exhaust gas purifying apparatus according claim 5, wherein said enriching means determines the execution timing using the control detection value after an upper limit time period which is longer than the preset time period, has elapsed from the time the rich spike ends.

* * * * *